(12) United States Patent
Jones et al.

(10) Patent No.: US 10,595,465 B2
(45) Date of Patent: Mar. 24, 2020

(54) AGRICULTURAL BALER INCLUDING BALER GATE CONTROL SYSTEM

(71) Applicant: Deere & Company, Moline, IL (US)

(72) Inventors: Austin J. Jones, Ottumwa, IA (US); Charles S. Sloan, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 475 days.

(21) Appl. No.: 15/427,990

(22) Filed: Feb. 8, 2017

(65) Prior Publication Data

US 2017/0290271 A1    Oct. 12, 2017

Related U.S. Application Data

(60) Provisional application No. 62/320,086, filed on Apr. 8, 2016.

(51) Int. Cl.
 *A01D 85/00* (2006.01)
 *A01F 15/07* (2006.01)
 *A01F 15/08* (2006.01)

(52) U.S. Cl.
 CPC ............ *A01F 15/08* (2013.01); *A01D 85/005* (2013.01); *A01F 15/07* (2013.01);
 (Continued)

(58) Field of Classification Search
 CPC .......... A01F 15/00; A01F 15/07; A01F 15/08; A01F 15/0875; A01F 15/0883;
 (Continued)

(56) References Cited

U.S. PATENT DOCUMENTS 3,163,302 A    12/1964  Pridgeon
3,945,507 A *  3/1976   Olsen .................... A01D 90/08
                                                      414/789.4
(Continued)

FOREIGN PATENT DOCUMENTS

AU         568143    12/1987
AU      2003262343    6/2005
(Continued)

OTHER PUBLICATIONS

EP17164319 Extended European Search Report dated Sep. 21, 2017 (6 pages).

*Primary Examiner* — Shelley M Self
*Assistant Examiner* — Katie L. Parr
(74) *Attorney, Agent, or Firm* — Michael Best & Friedrich LLP

(57) ABSTRACT

The disclosure provides a control system for agricultural equipment. The agricultural equipment includes a baler configured to produce a crop package. The control system includes a crop package barrier coupled to the baler and movable between a closed position and an open position. The control system also includes a crop package transfer system configured to move the crop package. The control system further includes a barrier control system configured to restrict movement of the crop package barrier as the crop package barrier is moving toward the open position from the closed position in response to at least one signal indicating the crop package is in an unpreferred location.

19 Claims, 13 Drawing Sheets

(52) U.S. Cl.
CPC ...... *A01F 15/0875* (2013.01); *A01F 15/0883* (2013.01); *A01D 2085/008* (2013.01)

(58) Field of Classification Search
CPC ........ A01F 15/106; A01F 15/14; A01F 15/16; A01F 15/20; A01F 2015/074; A01F 2015/0808; B30B 15/14; B30B 15/16; B30B 15/20; B30B 9/30; B30B 9/3003; B30B 9/3007; B30B 9/3014; A01D 90/08; A01D 90/083; A01D 90/12; A01D 85/00; A01D 85/005; A01D 2085/007; A01D 87/127; A01D 59/00; B65B 61/28; B60P 1/04; B60P 1/36; B60P 1/365; B65G 47/967
USPC ........... 100/7, 87, 88, 188 R, 345, 349, 350; 414/111, 489, 491, 528
See application file for complete search history.

(56) References Cited

U.S. PATENT DOCUMENTS

| | | | |
|---|---|---|---|
| 4,310,275 A | 1/1982 | Hoelscher | |
| 4,955,774 A | 9/1990 | Van Eecke et al. | |
| 5,842,823 A | 12/1998 | Kohnen et al. | |
| 6,053,685 A | 4/2000 | Tomchak | |
| 6,425,235 B1 | 7/2002 | Spaniol et al. | |
| 6,892,632 B1 | 5/2005 | Viesselmann et al. | |
| 7,000,533 B2 | 2/2006 | Derscheid et al. | |
| 7,401,547 B2 | 7/2008 | Degen | |
| 7,472,649 B1 | 1/2009 | Derscheid et al. | |
| 7,805,914 B2 | 10/2010 | Smith | |
| 7,918,158 B2* | 4/2011 | Viaud | A01F 15/0833 100/45 |
| 8,746,137 B1* | 6/2014 | Henry | A01F 15/0883 100/35 |
| 8,935,979 B2 | 1/2015 | Simmons et al. | |
| 2005/0247215 A1* | 11/2005 | Biziorek | A01D 90/10 414/24.5 |
| 2006/0086263 A1 | 4/2006 | Degen | |
| 2012/0189417 A1 | 7/2012 | Blough | |
| 2015/0272007 A1 | 10/2015 | Smith | |
| 2016/0014966 A1 | 1/2016 | Kraus et al. | |
| 2016/0014967 A1 | 1/2016 | Kraus et al. | |
| 2016/0014968 A1 | 1/2016 | Kraus et al. | |
| 2016/0014969 A1 | 1/2016 | Kraus et al. | |
| 2016/0014970 A1 | 1/2016 | Kraus et al. | |
| 2016/0014971 A1 | 1/2016 | Kraus | |

FOREIGN PATENT DOCUMENTS

| | | |
|---|---|---|
| CA | 2709397 | 5/2000 |
| DE | 2851117 | 6/1980 |
| EP | 0110056 | 6/1984 |
| EP | 983720 | 3/2000 |
| EP | 2923560 | 9/2015 |
| FR | 2679410 | 1/1993 |
| GB | 2106830 | 4/1983 |
| GB | 2204826 | 11/1988 |
| GB | 2297944 | 8/1996 |
| JP | 2003143927 | 5/2003 |
| PL | 158422 | 9/1992 |
| WO | 2014031355 | 2/2014 |

* cited by examiner

AGRICULTURAL BALER INCLUDING BALER GATE CONTROL SYSTEM

CROSS-REFERENCE TO RELATED APPLICATIONS

This application claims priority to U.S. Provisional Patent Application No. 62/320,086, filed Apr. 8, 2016, the content of which is incorporated herein by reference.

BACKGROUND

The present disclosure relates to an agricultural baler including a baler gate control system.

SUMMARY

In one aspect, the disclosure provides a control system for agricultural equipment. The agricultural equipment includes an accumulator coupled to a baler configured to support a crop package exiting the baler. The control system includes a crop package barrier coupled to the baler and rotatable between a closed position and an open position. The control system also includes a crop package transfer system coupled to the crop package barrier and configured to move the crop package onto the accumulator after the crop package is in a first position between the baler and the accumulator. The control system further includes a hydraulic control system having a hydraulic actuator operable to move the crop package barrier from the closed position to the open position and a second control system coupled to the hydraulic control system. The second control system is configured to restrict movement of the crop package barrier in response to the crop package barrier reaching a partially open position. The second control system is also configured to control movement of the crop package barrier from the partially open position to the open position in response to the crop package being positioned in the first position.

In another aspect, the disclosure provides a control system for agricultural equipment. The agricultural equipment includes a baler configured to produce a crop package. The control system includes a crop package barrier coupled to the baler and rotatable between a closed position and an open position. The open position is configured to permit exiting of the crop package from the baler. The control system also includes a first barrier control system having a first selective control valve and a hydraulic actuator operable to move the crop package barrier from the closed position to the open position in response to movement of the first selective control valve to a first position. The control system further includes a second barrier control system coupled to the first barrier control system. The second barrier control system is configured to limit movement of the crop package barrier in response to the crop package being in an unpreferred location and the crop package barrier reaching a partially open position.

In yet another aspect, the disclosure provides a control system for agricultural equipment. The agricultural equipment includes a baler configured to produce a crop package. The control system includes a crop package barrier coupled to the baler and movable between a closed position and an open position. The control system also includes a crop package transfer system configured to move the crop package. The control system further includes a barrier control system configured to restrict movement of the crop package barrier as the crop package barrier is moving toward the open position from the closed position in response to at least one signal indicating the crop package is in an unpreferred location.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

Figure 1:
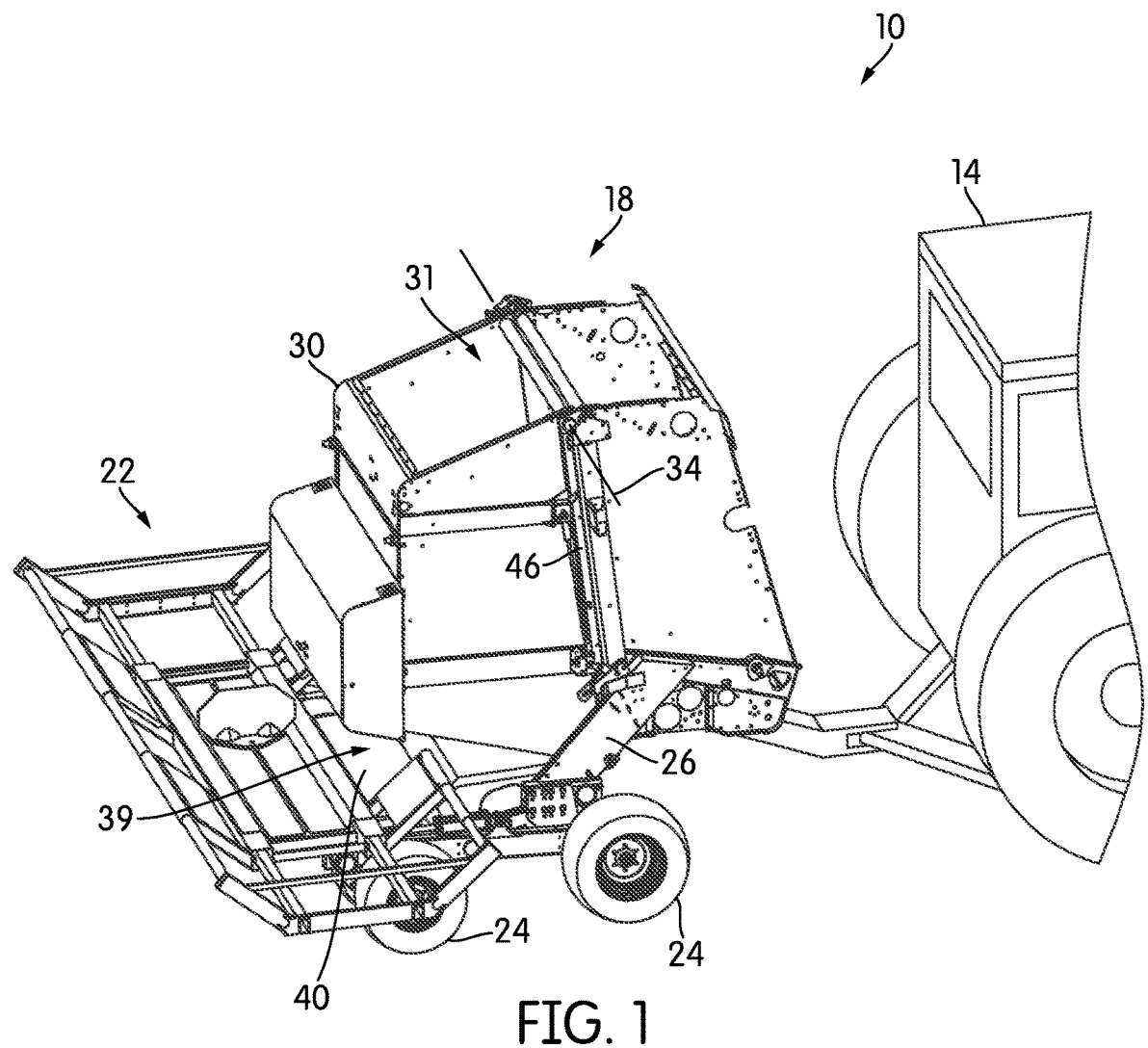
FIG. 1 is a perspective view of agricultural equipment including a vehicle coupled to an agricultural baler and an accumulator.

FIG. 1 illustrates certain agricultural equipment 10 including a tractor 14, a baler 18, and a crop package accumulator 22. The baler 18 (e.g., a crop packaging system) and the accumulator 22 (e.g., a crop package handling system) are both coupled to the tractor 14, which moves the baler 18 and the accumulator 22 during an agricultural process (e.g., through an agricultural field). The tractor 14 also supplies operational power in the form of hydraulic, electrical, and/or mechanical power to the baler 18 and the accumulator 22. The illustrated accumulator 22 is coupled to the baler 18 such that the baler 18 and the accumulator 22 are supported above a surface or the agricultural field by at least one common axle and associated structure, e.g., wheels 24, although the accumulator can have its own dedicated axles, wheels, and other supporting structural components.

Figure 12:
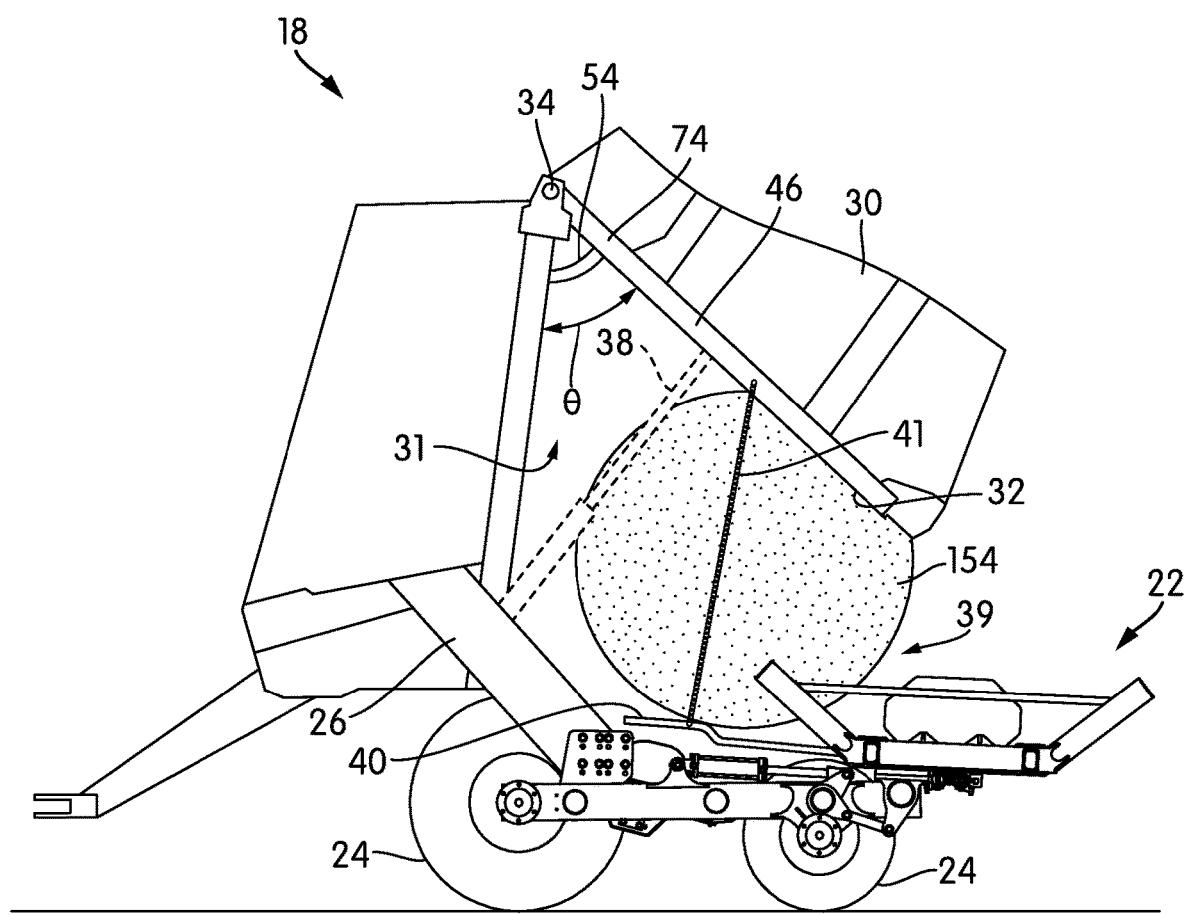
FIG. 12 is a side view of the agricultural baler and the accumulator of FIG. 1 illustrating the crop package exiting the agricultural baler in a second position.
Figure 14:
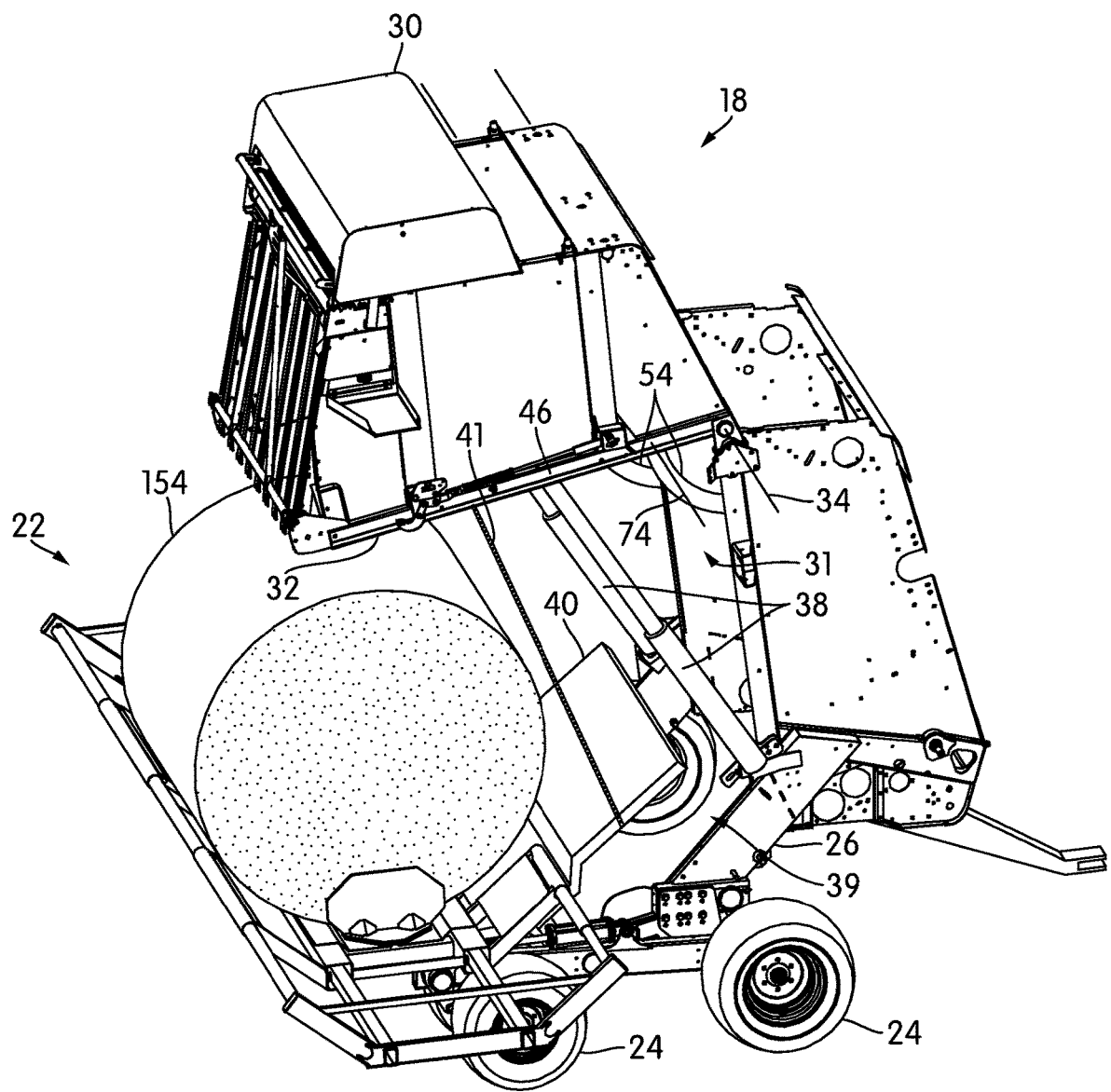
FIG. 14 is a perspective view of the agricultural baler and the accumulator of FIG. 1 illustrating the crop package supported on the accumulator.

The illustrated baler 18 is configured to produce generally cylindrical crop packages, e.g., round bales, from an agricultural field. The baler 18 may produce crop packages from hay, corn stalks, and the like. In other embodiments, the baler 18 may produce generally cuboid crop packages, e.g., square bales. In the illustrated embodiment, the baler 18 includes a baler frame 26 to which a baler gate or a crop package barrier 30 is pivotable about a first rotational axis 34 and positionable between a closed position (FIG. 1), an intermediate or partially open position (FIGS. 3, 10, and 12), and a fully open position (FIGS. 5 and 14) by gate hydraulic actuators 38 (FIG. 3), e.g., hydraulic cylinders. The closed position (FIG. 1) of the gate 30 is configured to allow for the formation of a crop package within a formation area or zone 31 of the baler 18. For example, the gate 30 is in the closed position when a perimeter 32 of the gate 30 substantially abuts or interfaces with the baler frame 26. In contrast, the open position (FIGS. 5 and 14) is configured to permit free exiting (e.g., unhindered by the gate 30) of a crop package from the baler 18. Moreover, the open position of the gate 30 may vary depending on a size of the crop package exiting the baler 18. For example, the gate 30 may open wider for a larger sized crop package exiting the baler 18 compared to a smaller sized crop package exiting the baler 18. As such, the baler 18 may actively change the open position of the gate 30 to account for different sized crop packages. In addition, the intermediate or partially open position of the baler gate 30 is configured to be between the closed and open positions so that the gate 30 passes through the intermediate position before reaching the open position, as described in detail below. In further embodiments, the baler gate 30 may translate or slide between the closed, intermediate, and open positions. In further embodiments, the crop package barrier 30 may be a skeleton structure that pivots within the baler frame 26 so that the skeleton structure does not abut the baler frame 26 in the closed position.

Figure 3:
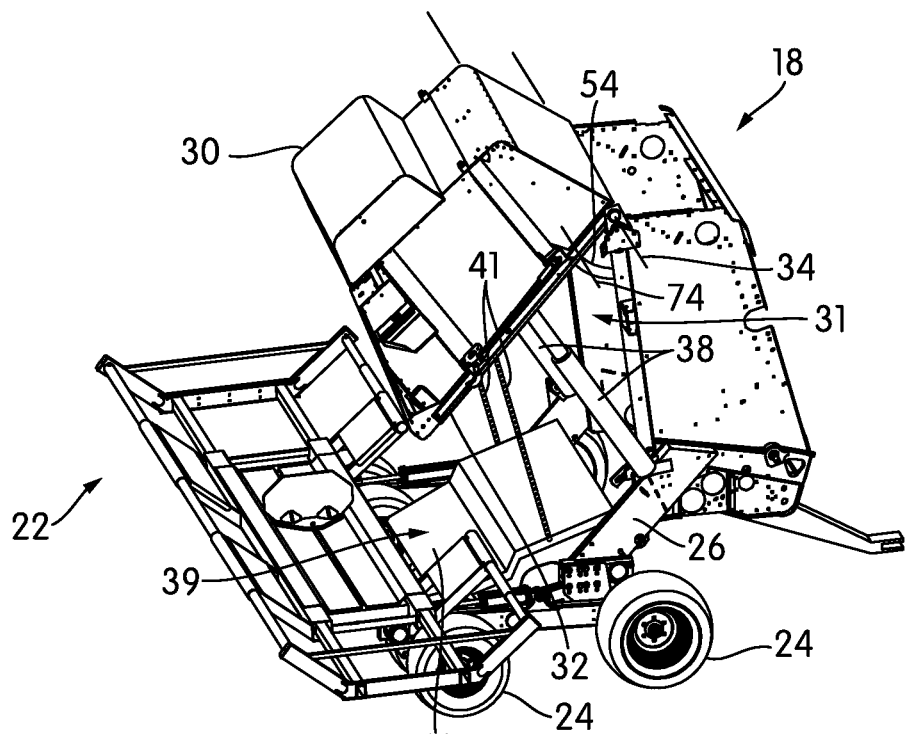
FIG. 3 is a perspective view of the agricultural baler and the accumulator of FIG. 1 illustrating the baler gate in a second position.
Figure 5:
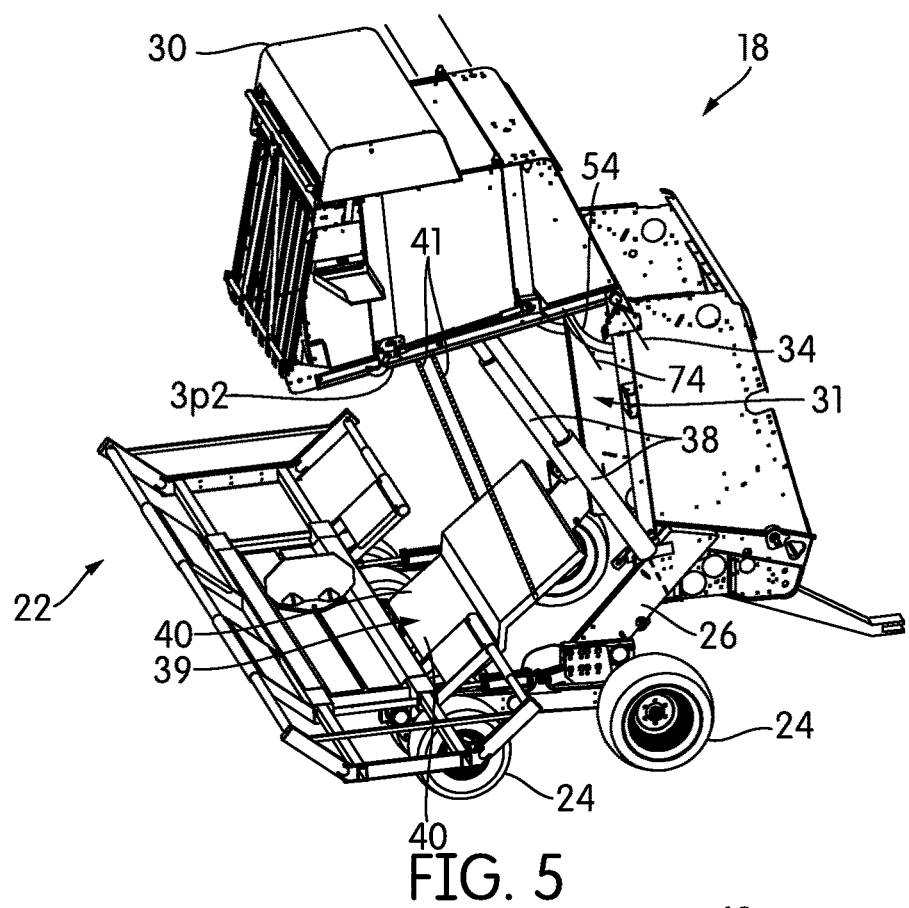
FIG. 5 is a perspective view of the agricultural baler and the accumulator of FIG. 1 illustrating the baler gate in a third position.

In addition, the accumulator 22 is sized and configured to support the crop packages that exit the baler 18. In particular, a crop package transfer member or system 39 of the baler 18 is positioned between the formation zone 31 of the baler 18 and the accumulator 22 and is configured to enable movement of the crop packages from the baler 18 onto the accumulator 22 or the agricultural field. In the illustrated embodiment, the crop package transfer system 39 includes a plate member 40 and a linkage 41 (e.g., linkage chains) with the linkage 41 coupling movement of the gate 30 with the plate member 40 (FIG. 3). The illustrated linkage chains 41 directly couple the gate 30 and the plate member 40 together so that the plate member 40 is configured to move with the gate 30 via the linkage chains 41 when the gate 30 moves from the intermediate position (FIG. 3) to the open position (FIG. 5). In other embodiments, the linkage 41 may be a mechanical, electrical, and/hydraulic linkage. For example, the linkage 41 may include hydraulic actuator(s), electric actuator(s), spring(s), telescoping linkage(s), etc.

Figure 2:
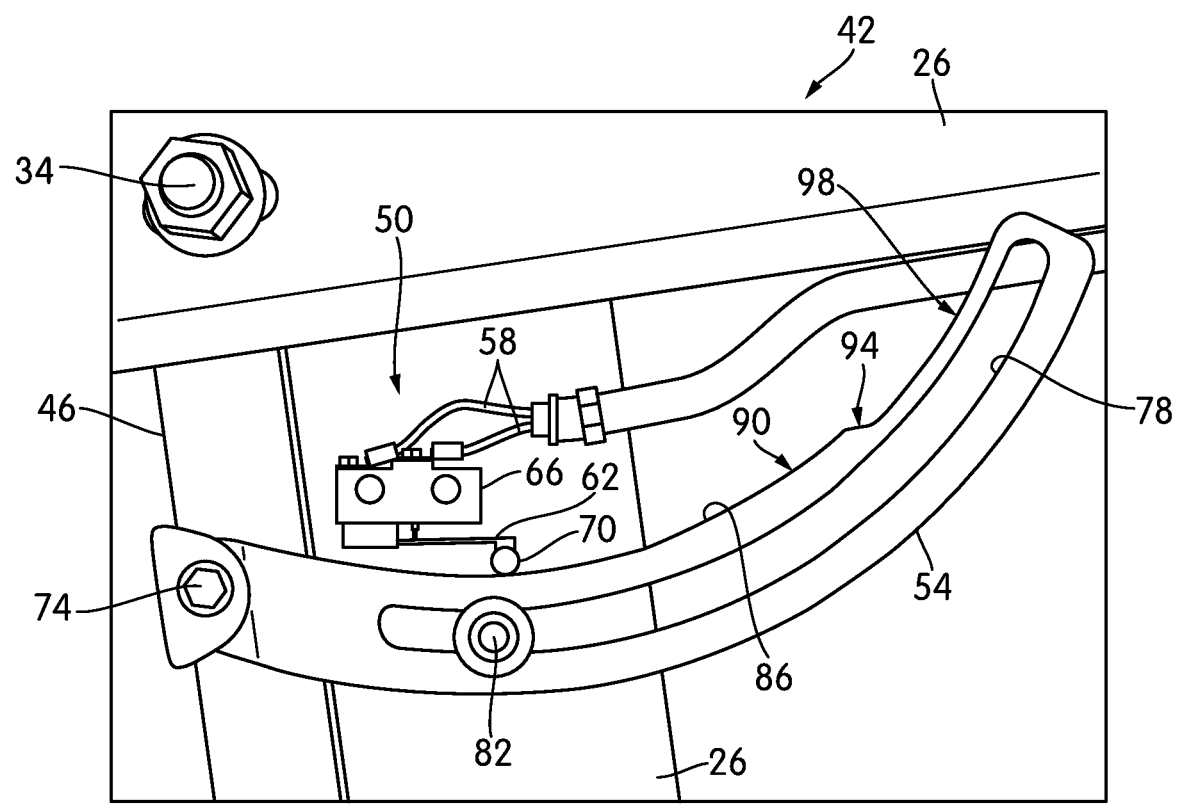
FIG. 2 is a detailed view of a portion of the agricultural baler of FIG. 1 including a position sensor and illustrating a first position of the baler gate.

With reference to FIG. 2, a gate position sensor system 42 is configured to monitor the position of the baler gate 30 while the baler gate 30 moves. The gate position sensor system 42 is also configured to indicate when the baler gate 30 reaches the intermediate position (FIG. 3). The illustrated gate position sensor system 42 is coupled between a frame member 46 of the baler gate 30 and the baler frame 26. In the illustrated embodiment, the sensor system 42 is located near the first rotational axis 34 and includes an electronic or gate position switch 50 positioned near an arcuate member 54 and fixed to the baler frame 26. In other embodiments, the switch 50 may be moveably adjustable relative to the baler frame 26. The illustrated gate position switch 50 is in electrical communication with the tractor 14 by electrical wires 58 and includes an arm 62 extending from a body 66 of the gate position switch 50 with a roller 70 positioned at an end of the arm 62. The arm 62 is configured to deflect or move relative to the body 66. In other embodiments, the gate position sensor system 42 may be an infrared sensor, rotary potentiometer sensor, a microswitch, a Hall effect sensor, etc. For example, the rotary potentiometer sensor may directly monitor a position (e.g., an angle) of the gate 30 or may indirectly monitor a position of the gate 30 via a linkage coupled to the gate 30.

The illustrated arcuate member 54 is pivotably coupled to the frame member 46 about a second rotational axis 74 for movement with the baler gate 30. In another embodiment, the arcuate member 54 may be fixed relative to the frame member 46. In the illustrated embodiment, a groove or slot 78 is formed in the arcuate member 54 to receive a pin 82 that is fixed relative to the baler frame 26. The arcuate member 54 also includes a surface 86 having a first portion 90, an angled or stepped portion 94, and a second portion 98 with the stepped portion 94 located between the portions 90, 98. In other embodiments, the stepped portion 94 may be defined by an adjustable member that is moveable (e.g., slidable) relative to the arcuate member 54 to adjust a position of the stepped portion 94 relative to the first and second portions 90, 98. The illustrated surface 86 is in direct contact with the roller 70 allowing the roller to transition between the portions 90, 94, 98 as the baler gate 30 moves. In the illustrated embodiment, the stepped portion 94 provides a descending step to the second portion 98 from the first portion 90. In other embodiments, the stepped portion 94 provides an ascending step to the second portion 98 from the first portion 90.

In the illustrated embodiment, the gate position sensor system 42 is positionable in three configurations in response to the gate 30 positioned in either the closed, intermediate, or open positions. Within all three configurations of the gate position sensor system 42, the gate position switch 50 and the pin 82 are fixed relative to the baler frame 26 with the arcuate member 54 rotatable with the frame member 46 underneath the gate position switch 50 (e.g., between the pin 82 and the gate position switch 50). With reference to FIGS. 1 and 2, the gate position sensor system 42 is in a first configuration when the gate 30 is in the closed position. The first configuration of the gate position sensor system 42 is defined as when the roller 70 is positioned within the first portion 90 of the arcuate member 54 adjacent the second rotational axis 74.

Figure 4:
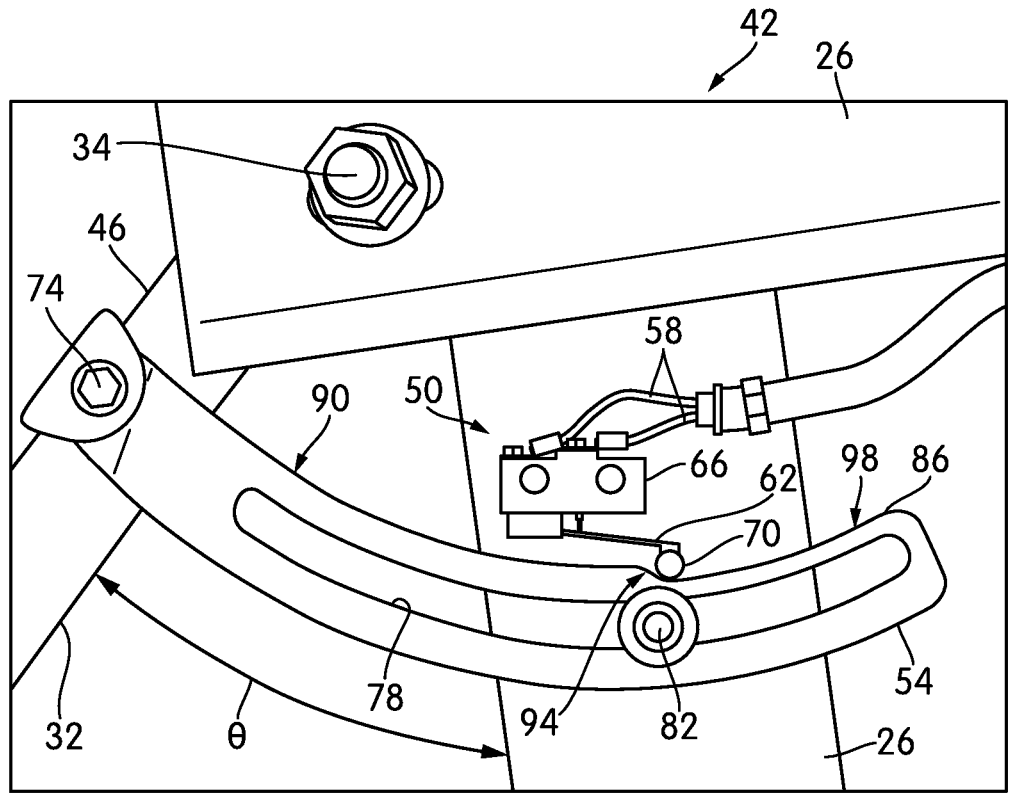
FIG. 4 is a detailed view of the position sensor and the second position of the baler gate of FIG. 3.

With reference to FIGS. 3 and 4, the gate position sensor system 42 is in a second configuration when the gate 30 reaches the intermediate position. Specifically, the second configuration of the gate position sensor system 42 is defined when the roller 70 interacts with the stepped portion 94 of the arcuate member 54. As such, the intermediate position of the gate 30 is defined as when the roller 70 reaches the stepped portion 94. For example, if the stepped portion 94 is positioned closer to the second rotational axis 74 along the arcuate member 54, the intermediate position of the gate 30 defines a smaller angle (e.g., an angle θ between the perimeter 32 of the gate 30 and the baler frame 26; FIGS.

4, 10, and 12) than if the stepped portion 94 where positioned farther away from the second rotational axis 74 along the arcuate member 54. In other embodiments, the angle of the intermediate position of the gate 30 may be adjusted by moving the stepped portion 94 relative to the first and second portions 90, 98 or by moving the switch 50 relative to the baler frame 26. In the illustrated embodiment, the intermediate position of the gate 30, which is defined by the angle θ, is between about 50 degrees and about 60 degrees. In other embodiments, the angle θ may be between 30 degrees and about 70 degrees. In further embodiments, the angle θ may be less than 30 degrees or greater than 70 degrees.

Figure 6:
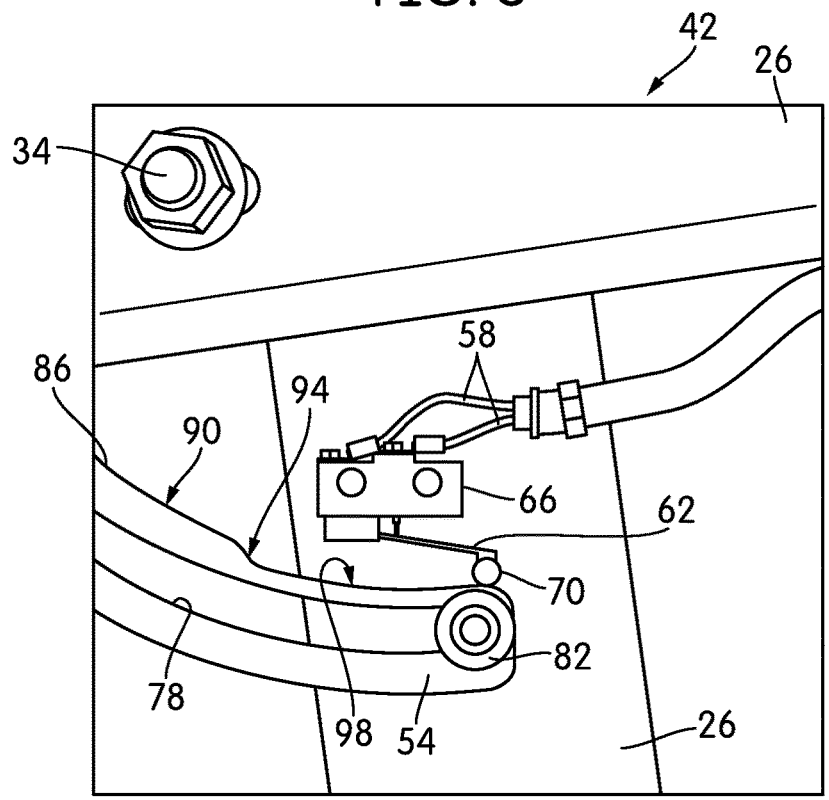
FIG. 6 is a detailed view of the position sensor and the third position of the baler gate of FIG. 5.

With reference to FIGS. 5 and 6, the gate position sensor system 42 is in a third configuration when the gate 30 is in the open position. Specifically, the third configuration of the gate position sensor system 42 is defined when the roller 70 passes by the stepped portion 94 into the second portion 98 of the arcuate member 54. In one embodiment, the roller 70 may be positioned in the second portion 98 while the gate 30 is still within the intermediate position. In the illustrated embodiment, the open position of the gate 30 is when an angle between the perimeter 32 and the baler frame 26 is about 85 degrees. As such, the intermediate position of the gate 30 is when the angle θ is between about 35 percent (e.g., 30 degrees) and about 82 percent (e.g., 70 degrees) of the angle defining the open position of 100 percent (e.g., 85 degrees).

In other embodiments, the gate position sensor system 42 may monitor the position of the baler gate 30 via the hydraulic actuators 38. For example, the gate position sensor system 42 may monitor a linear distance between an inner member and an outer member of at least one of the hydraulic actuators 38 to determine a position of the gate 30. Different linear distances between the inner member and the outer member correspond to the closed, intermediate, and open positions of the gate 30. In particular, a retracted state of the hydraulic actuators 38 (FIG. 1) corresponds to the closed position of the gate 30 and includes a shorter linear distance between the inner and outer members compared to an extended state of the hydraulic actuators 38 (FIG. 5), which corresponds to the open position of the gate 30. In addition, an intermediate state of the hydraulic actuators (FIG. 3) corresponds to the intermediate position of the gate 30 and includes a linear distance between the inner and outer members that is greater than the retracted state and less than the extended state of the hydraulic actuators 38.

As described above, the transfer member 39 is coupled to the gate 30 for movement with the gate 30. In particular, the transfer member 39 is inoperable (e.g., does not move) and is clear of other moving components of the baler 18 when the gate 30 transitions from the closed position (FIG. 1) to the intermediate position (FIG. 3). In other embodiments, the transfer member 39 may move before the gate 30 reaches the intermediate position. The illustrated transfer member 39 is operable (e.g., movable) by the linkage chains 41 when the gate 30 transitions from the intermediate position (FIG. 3) to the open position (FIG. 5). In the embodiment with the linkage chains directly coupling the gate 30 to the transfer member 39, the linkage chains do not move the transfer member 39 when the gate 30 transitions from the closed position (FIG. 1) to the intermediate position (FIG. 3), e.g., the linkage chains include enough slack to not move the transfer member 39. However, once the gate 30 transitions from the intermediate position (FIG. 3) to the open position (FIG. 5), the linkage chains are sized and configured to move the transfer member 39. In other embodiments, the transfer member 39 may move shortly before or after the gate 30 reaches the intermediate position due to the configuration of the linkage chains 41 (e.g., slack in the linkage chains 41).

Figure 7:
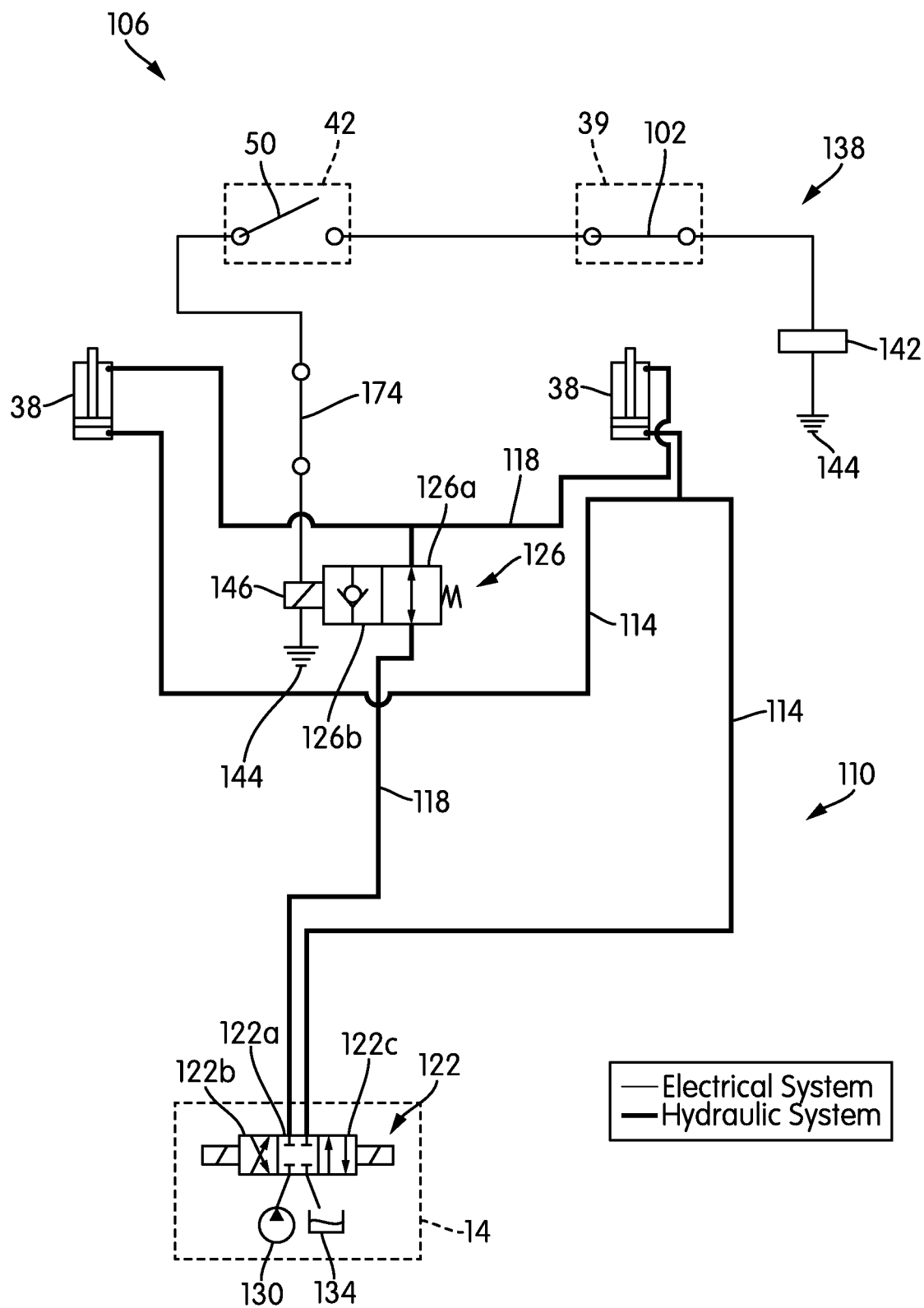
FIG. 7 is a schematic diagram of a hydraulic and electrical control system according to one embodiment coupled to the agricultural baler of FIG. 1.

With reference to FIG. 7, the baler 18 includes a hydraulic and electrical control system 106 operable to control the movement of the gate 30. The illustrated control system 106 is in communication with the tractor 14, the baler 18, and the accumulator 22 and may be integrated into the baler 18 and/or the accumulator 22. The control system 106 includes a hydraulic control system or a first barrier control system 110 coupled to the gate hydraulic actuators 38 via hydraulic lines 114, 118 and includes a first selective control valve 122 and a second selective control valve 126. The first selective control valve 122 is coupled to a hydraulic pump 130 and a reservoir 134, which are coupled to the tractor 14, and is positionable in a first position 122a, a second position 122b, and a third position 122c. When the first selective control valve 122 is in either the second position 122b or the third position 122c, fluid communication is provided between the pump 130, the reservoir 134, and the hydraulic lines 114, 118. However, when the first selective control valve 122 is in the first position 122a, fluid communication is blocked between the pump 130, the reservoir 134, and the hydraulic lines 114, 118.

The illustrated second selective control valve 126 is fluidly coupled to the hydraulic line 118 between the first selective control valve 122 and the gate hydraulic actuators 38. The second selective control valve 126 is positionable in a first position 126a that allows fluid communication between the gate hydraulic actuators 38 and the first selective control valve 122 and a second position 126b that blocks fluid communication between the gate hydraulic actuators 38 and the first selective control valve 122 (e.g., a check valve that selectively blocks hydraulic fluid traveling from the hydraulic actuators 38 to the first selective control valve 122). In another embodiment, the second position 126b may be an orifice rather than a check valve to restrict hydraulic fluid flow passing through the second control valve 126. In the illustrated embodiment, the second control valve 126 is biased into the first position 126a. In other embodiments, the second control valve 126 is biased into the second position 126b. In other embodiments, the second selective control valve 126 may be coupled to the hydraulic line 114 (e.g., between the first selective control valve 122 and the hydraulic actuators 38 so that the second selective control valve 126 selectively blocks hydraulic fluid traveling from the first selective control valve 122 to the hydraulic actuators 38).

With continued reference to FIG. 7, the illustrated control system 106 also includes an electrical control system or a second barrier control system 138 coupled to the gate position switch 50 of the gate position sensor system 42 and a crop package position sensor or switch 102 that is coupled to the transfer member 39. The illustrated crop package position switch 102 is configured to determine a position of a crop package such that operation of the transfer system 39 results in a successful movement of the crop package relative to the baler 18 (e.g., movement onto the accumulator 22 or an agricultural field). In the illustrated embodiment, the crop package position switch 102 is coupled to the transfer system 39 to monitor if a crop package is properly supported on or properly positioned relative to the plate member 40. In particular, the crop package position switch 102 is configured to signal when a crop package is directly supported on the transfer member 39. In other embodiments, the crop package position sensor 102 may be coupled to the baler 18, the gate 30, or the accumulator 22 and configured to monitor a position of a crop package relative to the baler 18, relative to the accumulator 22, or relative to the agricultural field. In other embodiments, the crop package position sensor 102 may be an infrared sensor, rotary potentiometer sensor, a microswitch, a Hall effect sensor, etc.

The electrical control system 138 includes a power source 142 coupled to a ground 144 and a control valve actuator 146 with the control valve actuator 146 coupled to the second selective control valve 126. The illustrated control valve actuator 146 is configured to move the second selective control valve 126 between the first and second positions 126a, 126b. In particular, activation of the control valve actuator 146 moves the second selective control valve 126 into the second position 126b, and deactivation of the control valve actuator 146 allows the second selective control valve 126 to bias into the first position 126a. In the illustrated embodiment, the power source 142, the crop package position switch 102, the gate position switch 50, and the control valve actuator 146 are configured in series, with the switches 50, 102 positioned between the power source 142 and the control valve actuator 146 and the crop package position switch 102 positioned between the gate position switch 50 and the power source 142. The illustrated gate position switch 50 is biased in an open configuration (e.g., inhibiting electrical current to travel through the switch 50), and the crop package position switch 102 is biased in a closed configuration (e.g., enabling electrical current to travel through the switch 102). In other embodiments, the gate position switch 50 is biased in the closed configuration, and the crop package position switch 102 is biased in the open configuration, and/or the gate position switch 50 is positioned between the crop package position switch 102 and the power source 142. In other embodiments, the electrical control system 138 may include a controller (e.g., an electrical relay) that is configured to send signals to the second control valve 126 to move the second control valve 126 between the first and second positions 126a, 126b. In further embodiments, electrical relays may be triggered by the switches 50, 102 to provide power to the second control valve 126.

Figure 7A:
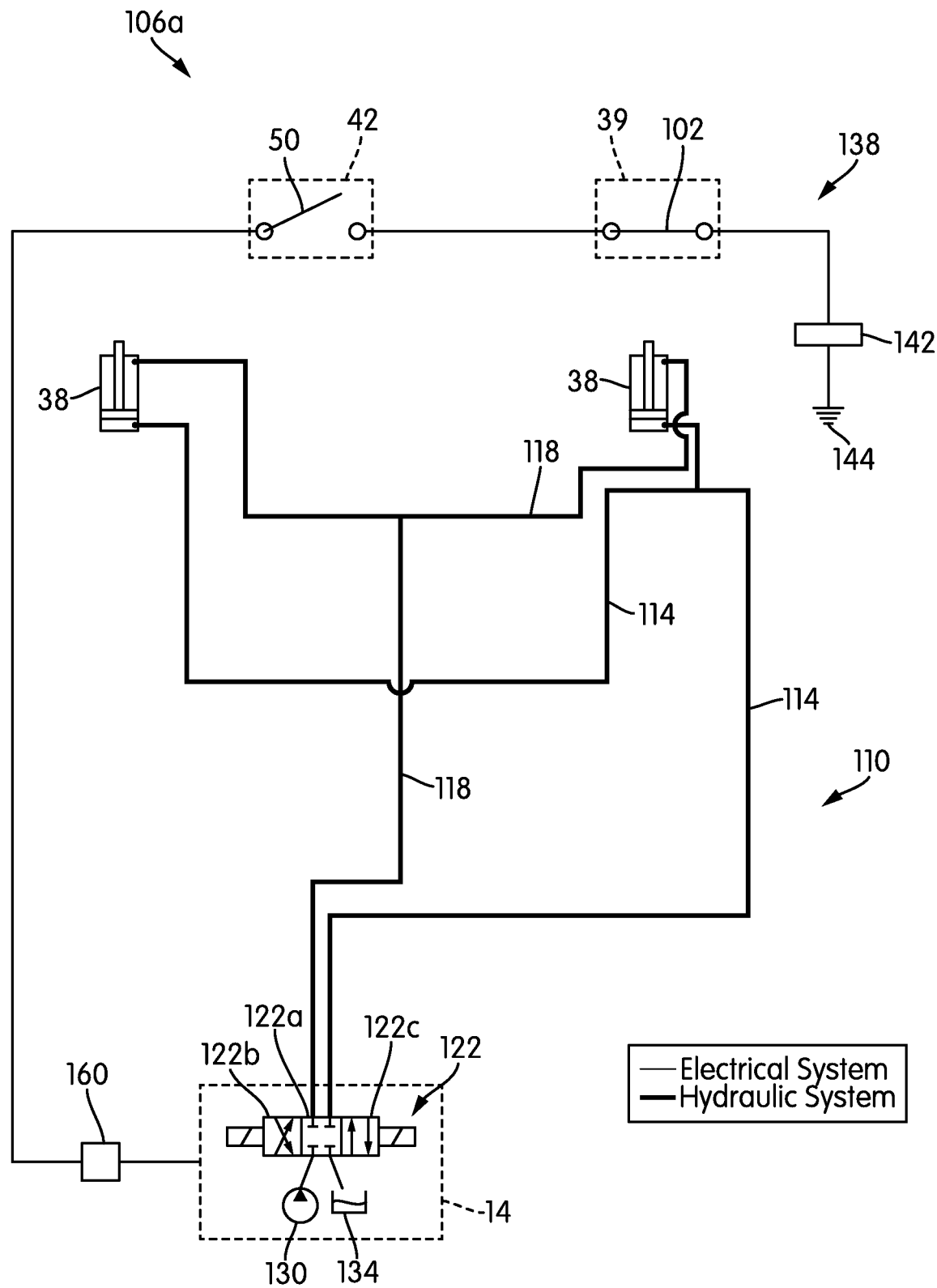
FIG. 7A is a schematic diagram of a hydraulic and electrical control system according to another embodiment coupled to the agricultural baler of FIG. 1.

In one embodiment as illustrated in FIG. 7A, a control system 106a, which operates similarly to the control system 106 as described below, includes a controller 160 in communication with the first selective control valve 122, the gate position sensor system 42, and the crop package position switch 102. The controller 160 automatically actuates the first selective control valve 122 into the first, second, or third positions 122a, 122b, 122c dependent upon a configuration (e.g., open or closed configuration) of the gate position switch 50 and/or the crop package position switch 102. As such, the second selective control valve 126 may be omitted from the control system 106a. In other embodiments, the controller 160 automatically actuates the first selective control valve 122 into the second or third positions 122b, 122c dependent upon a characteristic (e.g., weight, size, etc.) of a crop package fully formed in the formation zone 31, as described below. In further embodiments, the controller 160 may be in communication with other sensors and switches of the baler 18.

Figure 8:
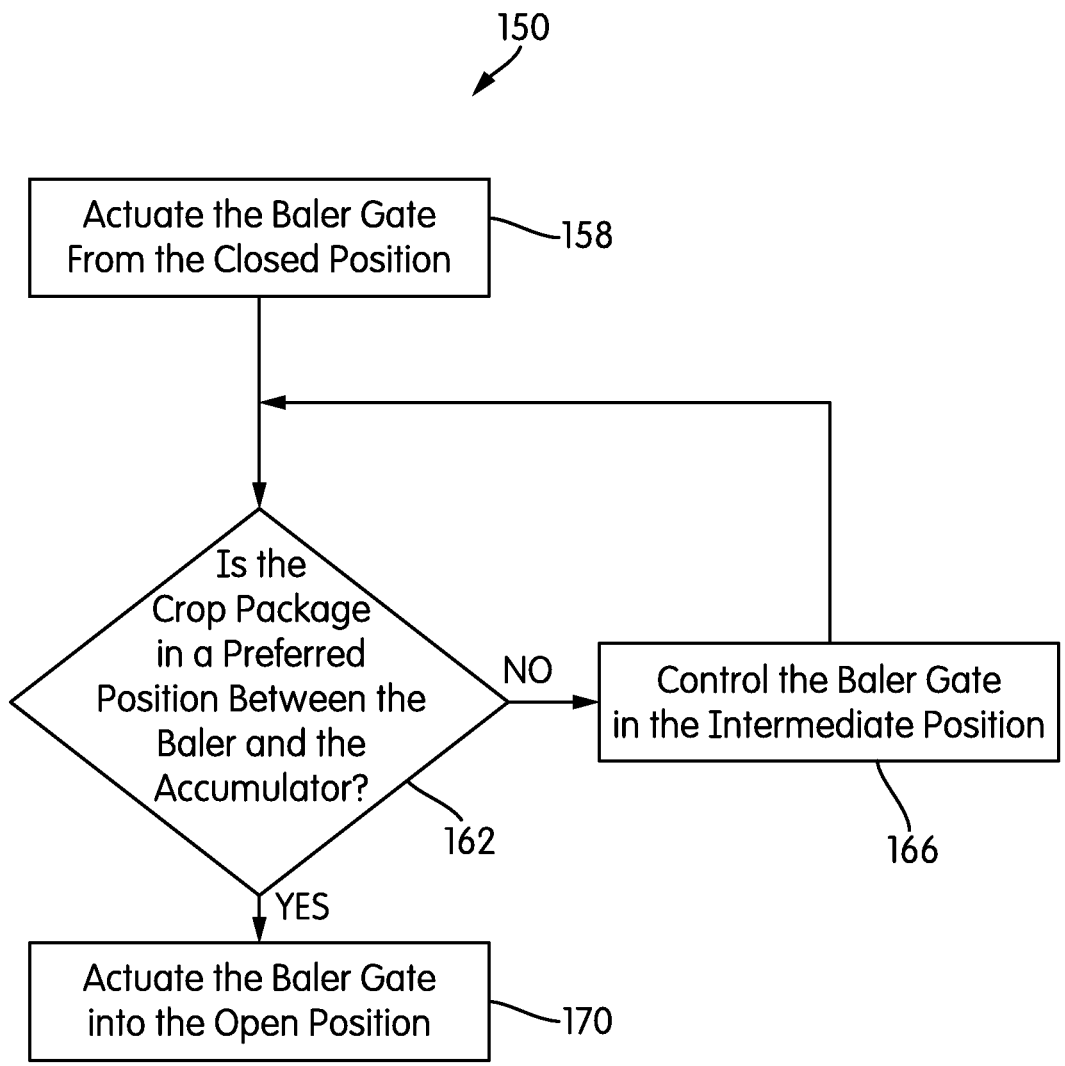
FIG. 8 is a flow diagram of a method of operation of the hydraulic and electrical control system of FIG. 7.
Figure 9:
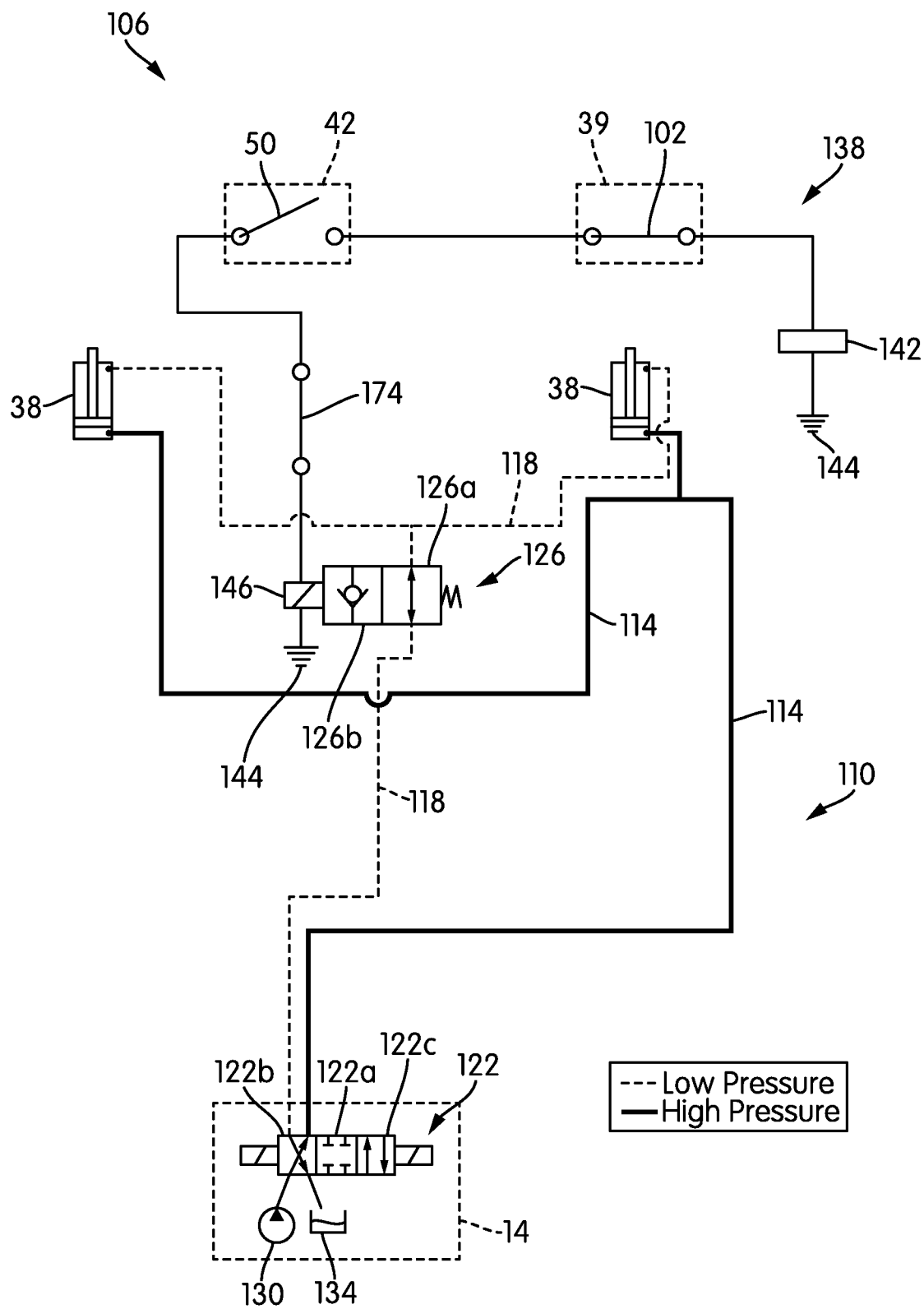
FIG. 9 is a schematic diagram of the hydraulic and electrical control system of FIG. 7 in a first configuration.

A method of operation 150 is performed by an operator of the tractor 14 and the control system 106 to move a crop package 154 (FIG. 10) from the baler 18 to the accumulator 22 (FIG. 8) or directly to an agricultural field. As the baler 18 moves across the agricultural field, the baler 18 creates the crop package 154 within the formation area 31 of the baler 18. Once the crop package 154 reaches a desired weight or size within the formation area 31 and is ready to exit the baler 18, the operator manually actuates the first selective control valve 122 into the second position 122b, or the controller 160 automatically actuates the first selective control valve 122 into the second position 122b to actuate movement of the gate 30 from the closed position (step 158; FIGS. 8 and 9). In particular, the operator or the controller 160 actuates the first selective control valve 122 into the second position 122b enabling hydraulic fluid from the pump 130 to pressurize the gate hydraulic actuators 38 via the hydraulic line 114 to move the gate 30 from the closed position (see also FIG. 1) towards the intermediate position (see also FIG. 3). For reference, hydraulic fluid provided by the pump 130 to the gate hydraulic actuators 38 is illustrated in solid lines and indicated as "high pressure" within FIGS. 9, 11, and 13. Within the step 158, the electrical control system 138 is in the open configuration because the gate position switch 50 is biased into the open configuration. As such, the control valve actuator 146 is electrically decoupled (e.g., deactivated) from the power source 142 allowing the second selective control valve 126 to bias into the first position 126a. While the second selective control valve 126 is in the first position 126a, hydraulic fluid is enabled to travel from the gate hydraulic actuators 38 to the reservoir 134 through the second selective control valve 126 via the hydraulic line 118. For reference, hydraulic fluid provided by the gate hydraulic actuators 38 to the reservoir 134 is illustrated in broken lines and indicated as "low pressure" within FIGS. 9, 11, and 13.

Figure 10:
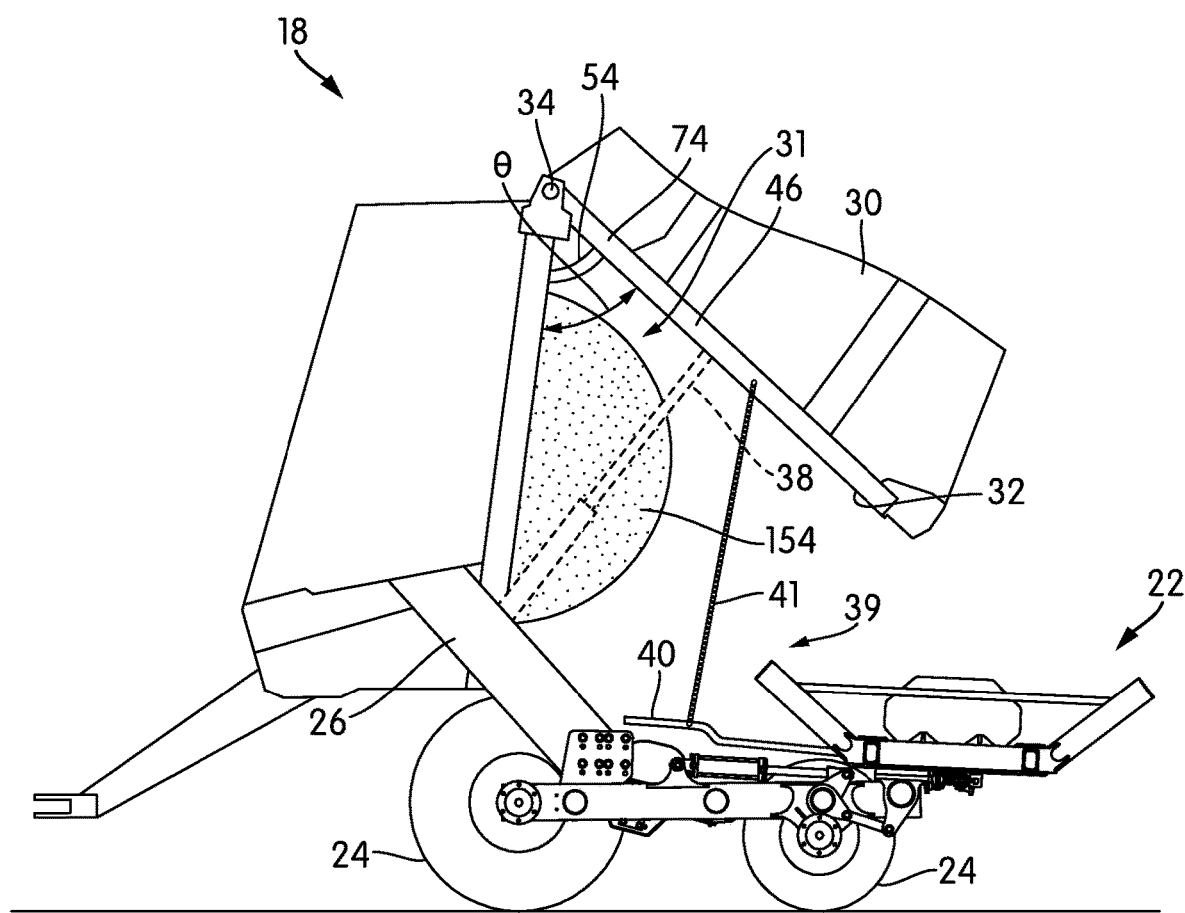
FIG. 10 is a side view of the agricultural baler and the accumulator of FIG. 1 illustrating a crop package exiting the agricultural baler in a first position.

With reference to FIGS. 8 and 10, as the gate 30 moves from the closed position toward the intermediate position, the control system 106 monitors a preferred position of the crop package 154 (step 162) relative to the formation zone 31 and/or the transfer member 39. The crop package 154 is located within the formation zone 31 when the crop package 154 is positioned in the same location as when completely formed in the baler 18 (e.g., when the gate 30 is in the closed position). However, the formation zone 31 may be different for different sized/weighted crop packages 154. For example, a smaller crop package 154 includes a smaller formation zone 31 than a formation zone 31 of a larger crop package 154. In the illustrated embodiment, the preferred position of the crop package 154 is when the crop package 154 is located rear of the formation zone 31 (e.g., when the crop package 154 is at least partially supported on the plate member 40). In other words, the preferred position of the crop package 154 is when the crop package 154 is positioned anywhere between the formation zone 31 and the agricultural field such that actuation of the transfer system 39 would result in a successful transfer of the crop package 154 from the formation zone 31 to the accumulator 22 or the agricultural field. In other embodiments, a sensor (e.g., an optical sensor or a weight sensor) may be coupled to the baler 18 (e.g., the baler frame 26) to monitor the presence of different sized/weighted crop packages 154 within respective formation zones 31 such that a crop package 154 is in the preferred position if the sensor does not detect the crop package 154 in the formation zone 31. Stated another way, the sensor determines an appropriate formation zone 31 for a particular size/weight of a crop package 154 to then determine if the particular crop package 154 is in or is not in the preferred position. In other embodiments, the crop package 154 may be partially located within the formation zone 31 and still be in the preferred position.

Figure 11:
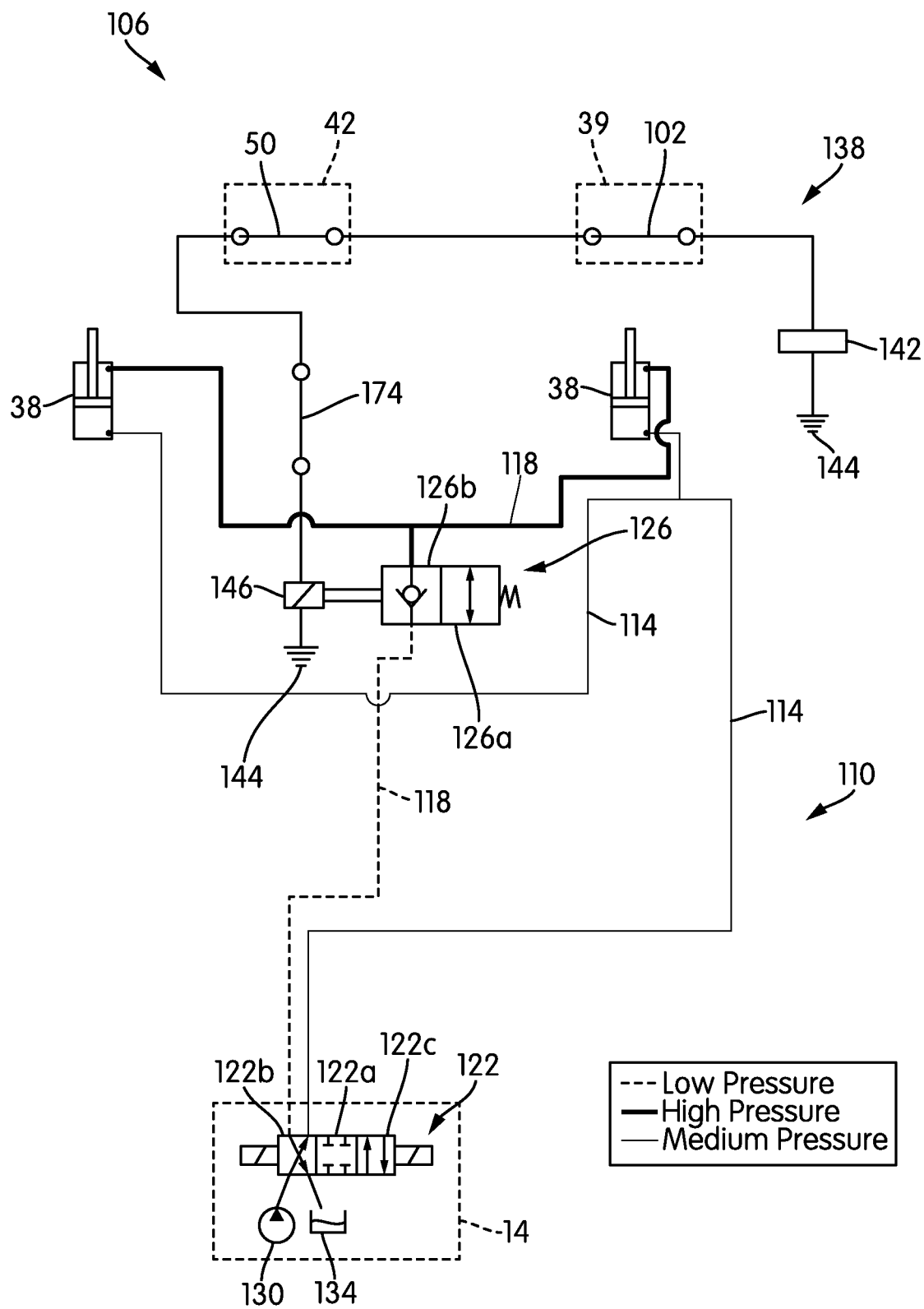
FIG. 11 is a schematic diagram of the hydraulic and electrical control system of FIG. 7 in a second configuration.

With reference to FIGS. 8, 10, and 11, if the crop package 154 is not in the preferred position (e.g., an unpreferred position) between the baler 18 and the accumulator 22 or the agricultural field (FIG. 10) when the gate 30 reaches the intermediate position, the control system 106 automatically controls the movement of the gate 30 (step 166, FIG. 8). In one embodiment, the control system 106 stops the gate 30 in the intermediate position. In other embodiments, the control system 106 may restrict, interrupt, or limit movement (e.g., angular velocity) of the gate 30 when the gate 30 reaches the intermediate position (e.g., the gate 30 does not completely stop, but rather "creeps" through the intermediate position). For example, in the embodiment where the check valve of the second selective control valve 126 is replaced with the orifice, the orifice of the second selective control valve 126 (e.g., the second position 126*b*) restricts the release of the hydraulic fluid from the hydraulic actuators 38, thereby slowing the movement of the gate 30. In the illustrated embodiment, once the roller 70 reaches the stepped portion 94 (FIG. 4) indicating that the gate 30 has reached the intermediate position, the gate position switch 50 moves from the open configuration (FIG. 9) to the closed configuration (FIG. 11). As a result, the power source 142 is electrically coupled to the control valve actuator 146 to activate the control valve actuator 146 to move the second selective control valve 126 into the second position 126*b* inhibiting the hydraulic fluid from flowing into the reservoir 134. In particular, the check valve of the second selective control valve 126 (e.g., the second position 126*b*) stops the release of hydraulic fluid from the hydraulic actuators 38 indicated as "high pressure" within FIG. 11, thereby stopping the movement of the gate 30.

In the embodiment of the control system 106*a* (FIG. 7A), the controller 160 automatically moves the first selective control valve 122 into the first position 122*a* when the roller 70 reaches the stepped portion 94 (FIG. 4) and the crop package position sensor 102 signals that the crop package 154 is not in the preferred location. For example, when the gate position switch 50 moves into the closed configuration and the crop package 154 is not in the preferred location on the crop package position sensor 102, the controller 160 automatically actuates the first selective control valve 122 into the first position 122*a*. Thereafter, movement of the gate 30 stops. However, if the gate position switch 50 is in the closed configuration and the crop package position sensor 102 signals the controller 160 that the crop package 154 is in the preferred location, the controller 160 will not automatically actuate the first selective control valve 122 into the first position 122*a*. Rather, the controller 160 will maintain the first selective control valve 122 in the second position 122*b*.

In further embodiments, an audible and/or visual alarm may be coupled to the tractor 14 and in communication with the gate position sensor system 42 and the crop package position switch 102 to alert the operator that the crop package 154 is not in the preferred position and that the gate 30 has reached the intermediate position. Thereafter, the operator actuates the first selective control valve 122 into the first position 122*a* to stop movement of the gate 30 until the crop package 154 is positioned within the preferred location.

In the illustrated embodiment, the control system 106, 106*a* automatically stops the movement of the gate 30 if the crop package 154 is not in a preferred location between the baler 18 and the accumulator 22 or the agricultural field (e.g., not supported on the transfer member 39). In some instances, the crop package 154 may be delayed from moving or rolling out of the baler 18 (e.g., the crop package 154 may be temporarily stuck within the baler 18, FIG. 10). If the crop package 154 is not in a proper position between the baler 18 and the accumulator 22, the gate 30, which is connected to the transfer member 39 by the linkage 41, could prematurely actuate the transfer member 39 (e.g., pivot the transfer member 39 from the position illustrated in FIG. 3 to the position illustrated in FIG. 5 when the gate 30 is moving into the open position (FIG. 5)) before the crop package 154 is properly supported on the transfer member 39. As such, the transfer member 39 is not allowed to properly move the crop package 154 onto the accumulator 22 or the agricultural field.

Figure 13:
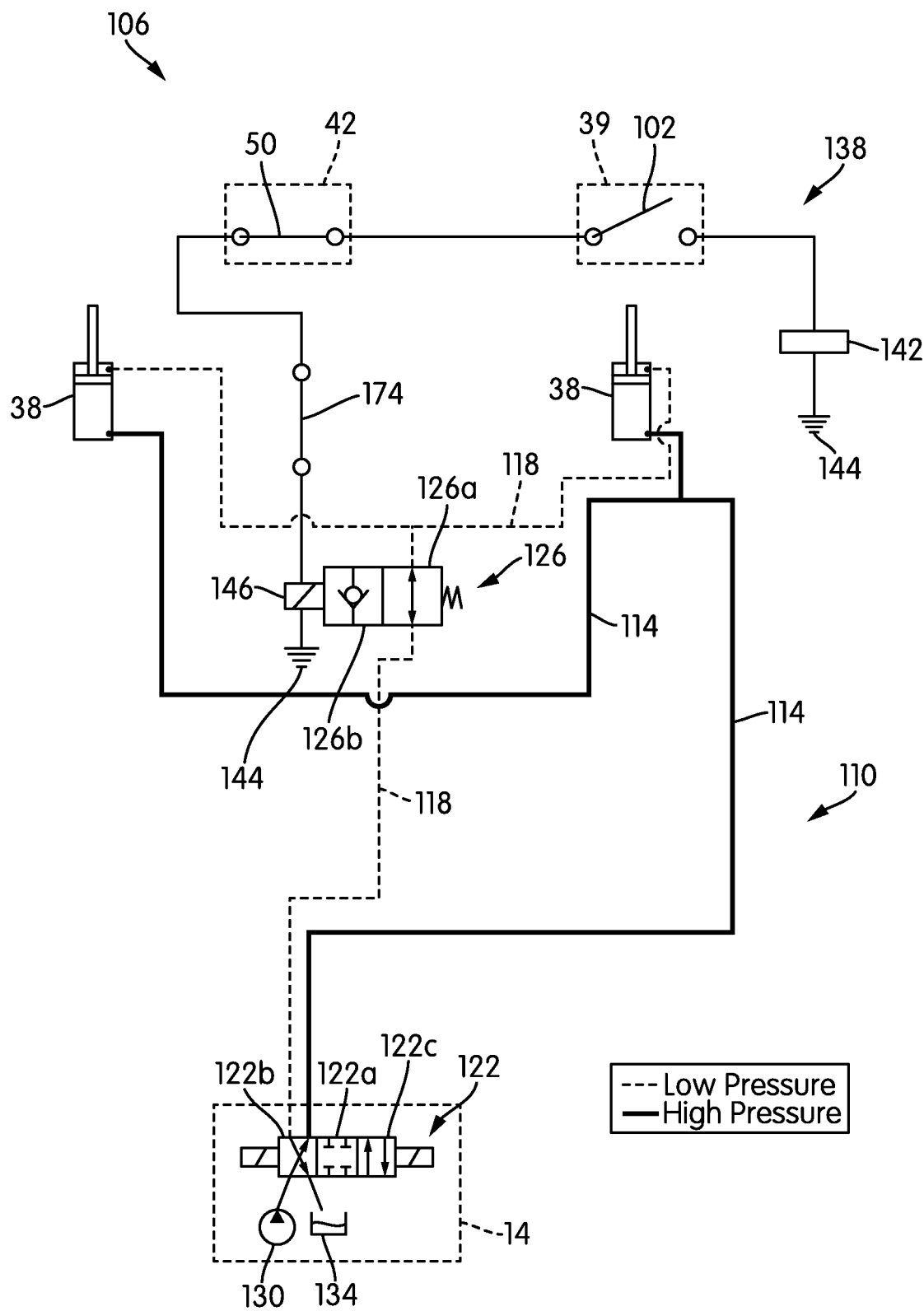
FIG. 13 is a schematic diagram of the hydraulic and electrical control system of FIG. 7 in a third configuration.

The gate 30 remains in the intermediate position (FIG. 10) until the crop package 154 is in an area between the baler 18 and the accumulator 22 or the agricultural field acceptable for the transfer system 39 to move the crop package 154 (e.g., supported on the plate member 40). Once the crop package 154 is in a preferred position (step 162, FIG. 8), the crop package position switch 102 moves from the closed configuration (FIG. 11) to the open configuration (FIG. 13). As such, the power source 142 is again decoupled from the control valve actuator 146 allowing the second selective control valve 126 to bias back into the first position 126*a*. In another embodiment, the crop package position switch 102 may be configured to stay in a particular position (e.g., the open configuration or the closed configuration) after the transfer member 39 has moved a certain amount (e.g., once the crop package 154 loses contact with the crop package position switch 102 as the crop package 154 travels further rearward toward the accumulator 22 or the agricultural field).

In the embodiment of the control system 106*a* (FIG. 7A), the controller 160 automatically moves the first selective control valve 122 back into the second position 122*b* when the crop package position switch 102 moves from the closed configuration (FIG. 11) to the open configuration (FIG. 13) indicating that the crop package 154 is in the preferred position between the baler 18 and the accumulator 22 or the agricultural field (step 162, FIG. 8).

Consequently when the crop package 154 is supported on the plate member 40, fluid communication between the gate hydraulic actuators 38 and the reservoir 134 is restored via either the first or second selective control valves 122, 126 allowing hydraulic fluid from the pump 130 to continue moving the gate 30 from the intermediate position (FIG. 12) to the open position (step 170, FIG. 8). The gate position switch 50 is also biased back into the open configuration (FIG. 7) when the hydraulic actuators 38 move the gate 30 out of the intermediate position and towards the open position. As the gate 30 moves into the open position (FIG. 14), the gate 30 actuates the transfer member 39 via the linkage chains 41, thereby moving the crop package 154 toward and onto the accumulator 22 or the agricultural field.

As such, the operator manually actuates the first selective control valve 122 once to begin movement of the gate 30 from the closed position to the open position. Thereafter, the control system 106, 106*a* automatically controls movement of the gate 30 depending upon a position of the crop package 154. In the embodiment including the controller 160 (FIG. 7A), the controller 160 automatically actuates the first selective control valve 122 to begin movement of the gate 30 from the closed position to the open position depending on a characteristic of the crop package 154. Thereafter, the controller 160 automatically controls movement of the gate 30 depending upon a position of the crop package 154. In another embodiment, a combination of the controller 160 and the control system 106 can be configured such that the controller 160 actuates the second selective control valve 126 using inputs from the gate position switch 50 and the crop package position switch 102 to control movement of the gate 30 from the closed position to the open position.

The crop package position switch 102 does not return to the closed configuration (FIG. 11) until the gate 30 is moving into the closed position from the open position after the crop package 154 exits the baler 18. Furthermore, the control system 106, 106a is not configured to control movement of the gate 30 while the gate 30 is moving from the open position to the closed position. Stated another way, the control system 106, 106a is only configured to control movement of the gate 30 while the gate 30 is moving from the closed position to the open position. In another embodiment, the control system 106a may initiate continuous movement of the gate 30 from the open position to the closed position (e.g., the gate position switch 50 and the crop package position sensor 102 do not signal the control system 106a to restrict or stop movement of the gate 30 when the gate 30 is moving from the open position to the closed position).

In the illustrated embodiment, the control system 106 also includes an override system (e.g., an electrical override system) 174 configured to selectively allow movement of the gate 30 into the open position (FIG. 14) regardless of the respective orientations of the gate position switch 50 and the crop package position sensor 102. In the illustrated embodiment, the override system 174 is biased in a closed configuration and can be located anywhere between the power source 142 and the ground 144 as illustrated in FIGS. 7, 9, 11, and 13. The operator of the tractor 14 may actuate the override system 174 in an open configuration so that the second selective control valve 126 is biased into the first position 126a allowing hydraulic fluid to enter the gate hydraulic actuators 38 to move the gate 30 into the open position with or without the presence of the crop package 154 at least partially on the transfer system 39. Accordingly, the operator may service or clean the baler 18 or accumulator 22 with the gate 30 locked in the open position.

In another embodiment of the electrical control system 138, the second selective control valve 126 may be biased into the second position 126b, and the gate position switch 50 and the crop package position switch 102 may be both biased in the closed configuration (e.g., providing electrical communication between the power source 142 and the control valve actuator 146). Thus, the control valve actuator 146 is activated when the gate 30 is moving from the closed position (FIG. 1) toward the intermediate position (FIG. 10), and the control valve actuator 146 is deactivated when the gate 30 is in the intermediate position (FIG. 10). In particular, the control valve actuator 146 moves the second control valve 126 into the first position 126a when the gate 30 is moving toward the intermediate position (FIG. 10). Once the gate 30 reaches the intermediate position (FIG. 10), the gate position switch 50 moves into the open configuration to electrically decouple the power source 142 from the control valve actuator 146, thereby allowing the second control valve 126 to bias into the second position 126b. In this embodiment, once the crop package 154 is supported on the transfer member 39, the gate position switch 50 moves back into the closed configuration (via a controller) for the control valve actuator 146 to activate and to move the second selective control valve 126 back into the first position 126a. Accordingly, the gate 30 moves into the open position (FIG. 14) and the crop package 154 is moved onto the accumulator 22.

In another embodiment, the control system 138 may be a mechanical control system. For example, the gate position switch 50 may be a first mechanical trigger, valve, latch assembly or the like that is actuated once the gate 30 reaches the intermediate position, and the crop package position switch 102 may be a second mechanical trigger, valve, latch assembly or the like that is actuated once the crop package 154 is in the preferred position on the crop package transfer system 39. As such, the first mechanical trigger stalls movement of the gate 30 until the crop package 154 triggers the second mechanical trigger. The second mechanical trigger produces a signal (mechanically) indicating that the crop package 154 is in the preferred position. In further embodiments, the control system 106 may be any combination of electrical, mechanical, and/or hydraulic systems and components.

In further embodiments, the control system 138 may include one sensor system coupled to the hydraulic actuators 38 to monitor hydraulic pressure within the hydraulic cylinders 38 to determine the position of the crop package 154. As described above, the movement of the transfer member 39 is coupled to the movement of the gate 30 through the linkage chains 41. Therefore, additional force acting on the transfer member 39 (by the crop package 154 supported on the transfer member 39) will act against the movement of the gate 30 by the hydraulic actuators 38. As such, if the crop package 154 is in the preferred position (e.g., supported on the transfer member 39), a greater hydraulic force is required to move the gate 30 toward the open position. Conversely, if the crop package 154 is not in the preferred position (e.g., not supported on the transfer member 39), a lesser hydraulic force is required to move the gate 30 toward the open position. As such, the control system 138 measures a hydraulic pressure within the hydraulic actuators 38 and if the hydraulic pressure is below a determined threshold value, then the control system 138 will signal that the crop package 154 is not in the preferred position, and if the hydraulic pressure is at or above the determined threshold value, then the control system 138 will signal that the crop package 154 is in the preferred position.

The invention claimed is:

1. A control system for agricultural equipment, the agricultural equipment including a baler configured to produce a crop package, the control system comprising:
    a crop package barrier coupled to the baler and rotatable between a closed position and an open position, the open position configured to permit exiting of the crop package from the baler;
    a first barrier control system including
        a first selective control valve, and
        a hydraulic actuator operable to move the crop package barrier from the closed position to the open position in response to movement of the first selective control valve to a first position; and
    a second barrier control system coupled to the first barrier control system, the second barrier control system configured to limit movement of the crop package barrier in response to the crop package being in an unpreferred location and the crop package barrier reaching a partially open position.

2. The control system of claim 1, wherein the crop package barrier is rotatable about an axis, and wherein the partially open position of the crop package barrier is between 30 degrees and 70 degrees relative to the closed position of the crop package barrier about the axis.

3. The control system of claim 1, wherein the second barrier control system includes a controller that is in communication with the first selective control valve, and wherein the controller is configured to automatically move the first selective control valve to limit movement of the crop package barrier.

4. The control system of claim 1, wherein the first barrier control system includes a second selective control valve moveable into a first position and into a second position, and wherein the second barrier control system is in communication with a control valve actuator that is coupled to the second selective control valve, and wherein the control valve actuator is configured to move the second selective control valve between the first and second positions.

5. The control system of claim 4, wherein the second barrier control system is configured to move the second selective control valve between the first and second positions when the first selective control valve is in the first position.

6. The control system of claim 4, wherein the first barrier control system is configured to move the crop package barrier in response to the second selective control valve being in the first position.

7. The control system of claim 6, wherein the second barrier control system is configured to move the second selective control valve into the second position via the control valve actuator, and wherein the second barrier control system is configured to limit movement of the crop package barrier in response to the second selective control valve being in the second position.

8. The control system of claim 7, wherein the second barrier control system is configured to move the second selective control valve into the second position in response to the crop package barrier reaching the partially open position.

9. The control system of claim 8, wherein the second barrier control system is configured to move the second selective control valve into the first position in response to the crop package moving into a preferred location relative to the baler.

10. The control system of claim 9, wherein the preferred location of the crop package is defined by the crop package being located between a formation zone of the baler and a surface that supports the baler.

11. The control system of claim 1, wherein the second barrier control system is at least partially an electrical barrier control system, a mechanical barrier control system, or a hydraulic barrier control system.

12. A control system for agricultural equipment, the agricultural equipment including a baler configured to produce a crop package, the control system comprising:
a crop package barrier coupled to the baler and movable between a closed position and an open position;
a crop package transfer system configured to move the crop package; and
a barrier control system configured to restrict movement of the crop package barrier as the crop package barrier is moving toward the open position from the closed position in response to at least one signal indicating the crop package is in an unpreferred location.

13. The control system of claim 12, wherein the crop package barrier is coupled to the crop package transfer system by a linkage, and wherein the crop package transfer system is actuated by the crop package barrier to move the crop package when the crop package is supported on the crop package transfer system, and wherein the partially open position is between the closed and open positions.

14. The control system of claim 12, wherein the crop package barrier is rotatable about an axis, and wherein the barrier control system is configured to restrict movement of the crop package barrier in response to the crop package barrier being positioned between 30 degrees and 70 degrees relative to the closed position of the crop package barrier about the axis.

15. The control system of claim 12, further comprising a hydraulic control system including a first hydraulic actuator operable to move the crop package barrier from the closed position to the open position, wherein the hydraulic control system includes a selective control valve moveable in a first position and a second position, and wherein the barrier control system is in communication with a control valve actuator that is coupled to the selective control valve, and wherein the control valve actuator is configured to move the selective control valve between the first and second positions.

16. The control system of claim 15, wherein the hydraulic control system is configured to move the crop package barrier in response to the selective control valve being in the first position, and wherein the barrier control system is configured to restrict movement of the crop package barrier in response to the second selective control valve being in the second position.

17. The control system of claim 16, wherein the barrier control system is configured to move the selective control valve into the first position in response to the crop package moving into a preferred location.

18. The control system of claim 17, wherein the preferred location of the crop package is defined by the crop package being located between a formation zone of the baler and a surface that supports the baler.

19. The control system of claim 12, wherein the barrier control system is at least partially an electrical barrier control system, a mechanical barrier control system, or a hydraulic barrier control system.

* * * * *